United States Patent
Fouts

[11] Patent Number: 6,047,359
[45] Date of Patent: Apr. 4, 2000

[54] PREDICTIVE READ CACHE MEMORIES FOR REDUCING PRIMARY CACHE MISS LATENCY IN EMBEDDED MICROPROCESSOR SYSTEMS

[75] Inventor: Douglas Jai Fouts, Pacific Grove, Calif.

[73] Assignee: The United States of America as Represented by the Secretary of the Navy, Washington, D.C.

[21] Appl. No.: 08/964,046

[22] Filed: Nov. 4, 1997

[51] Int. Cl.$^7$ .................................................. G06F 12/08
[52] U.S. Cl. .............................. 711/137; 711/122; 711/3
[58] Field of Search .................................. 711/122, 137, 711/3; 712/207

[56] References Cited

U.S. PATENT DOCUMENTS

| | | | |
|---|---|---|---|
| 5,261,066 | 11/1993 | Jouppi et al. | 711/122 |
| 5,305,389 | 4/1994 | Palmer | 382/305 |
| 5,361,391 | 11/1994 | Westberg | 711/137 |
| 5,396,604 | 3/1995 | DeLano et al. | 712/207 |
| 5,778,436 | 7/1998 | Kedem et al. | 711/137 |

OTHER PUBLICATIONS

Fouts, Douglas J. and Arthur B. Billingsley, "Predictive Read Caches: An Alternative to On–Chip Second–Level Cache Memories", Journal of Microelectronic Systems Integration, vol. 2, No. 2, pp. 109–121, Jun. 1994.

*Primary Examiner*—Reginald G. Bragdon
*Attorney, Agent, or Firm*—Donald E. Lincoln

[57] ABSTRACT

A predictive read cache reduces primary cache miss latency in a microprocessor system that includes a microprocessor, a main memory and a primary cache memory connected between the main memory and the microprocessor via an instruction address bus, a data address bus and a data bus. The predictive read cache tracks the pattern of data read addresses that cause misses in the primary cache and associates the pattern with the specific instruction that generates the pattern of miss addresses. When a pattern has been determined, the address where the next cache data read miss will occur is predicted and sent to memory at a time when the memory is not busy with other transactions. The data at the predicted miss address is then fetched and stored in the predictive read cache. The next time a data read miss occurs in the primary cache, if the miss address matches one of the predicted miss addresses stored in the cache, then the required data is immediately sent to the primary cache from the predictive cache, rather than having to be read out of the much slower main memory.

9 Claims, 8 Drawing Sheets

PREDICTIVE READ CACHE MEMORIES FOR REDUCING PRIMARY CACHE MISS LATENCY IN EMBEDDED MICROPROCESSOR SYSTEMS

BACKGROUND OF THE INVENTION

1. Field of the Invention.

This invention relates generally to memories for digital computer systems and particularly to multilevel hierarchical memories. Still more particularly, this invention relates to a cache memory that reduces cache miss latency by tracking multiple cache data read miss address patterns and by associating each cache data read miss address pattern with the specific instruction that generated the miss address pattern to improve the probability of a correct prediction.

2. Description of the Prior Art

Modern, high-performance microprocessors have extremely high memory bandwidth requirements and very short memory latency requirements. Memory latency is defined as the time between when the processor sends out a memory read address and when it receives the data back. In such systems, if a single-level memory hierarchy is used, then the memory subsystem must be constructed using high-speed static random access memory (SRAM) integrated circuits (ICs) because no other technology can meet the memory bandwidth and latency requirements. However, implementing a large main memory system with high-speed SRAM is not practical for most applications because of cost, size, power consumption, cooling, and weight constraints. Therefore, most computers utilize a multilevel, hierarchical memory subsystem that consists of a large, but relatively slow, main memory augmented by a much smaller but very high-speed cache memory. The main memory is usually constructed with dynamic RAM (DRAM) ICs. With modem microprocessors, the cache memory is usually implemented on the microprocessor chip using high-speed static RAM technology, although an off-chip cache can be constructed using high-speed static RAM ICs.

The use of a high-performance microprocessor chip with an on-board primary cache memory leads to the problem of cache-miss latency. The read access time to data in an on-board, high-speed, cache memory is typically one clock cycle. However, the read access time to data that is not in the cache can be as high as hundreds of clock cycles. This extreme difference in access time between the cache and the main memory is very significant with modern reduced instruction set computing (RISC) microprocessors that execute instructions at a rate of at least one every clock and operate at clock rates in the hundreds of megahertz. Therefore, the latency encountered when a miss occurs in the on-board cache can become a significant portion of the average read access time, even if the cache miss ratio is small.

Second-level, off-chip, cache memories are the usual means for reducing the cache-miss latency of high-performance workstations, file servers, and main frame computers. The problem with second-level cache memories is that they require an array of power consuming, heat generating, and expensive SRAM ICs that can significantly increase the size, weight, power consumption, and generated heat. Therefore, second-level cache memories are generally unsatisfactory for embedded computers. Embedded computers are normally designed to be small, lightweight, consume small amounts of power, and generate small amounts of heat in applications where they provide control and communications, such as satellites, weapon systems, and portable, mobile, and aeronautical computing systems.

SUMMARY OF THE INVENTION

The predictive read cache memory according to the present invention can be used in place of an entire second-level cache memory to obtain nearly the same result, depending on the application. The predictive read cache tracks the pattern of data read addresses that cause misses in the on-board primary cache and associates the pattern with the specific instruction that generates the pattern of miss addresses. When a pattern has been determined, the address where the next cache data read miss will occur is predicted and sent to memory at a time when the memory is not busy with other transactions. The data at the predicted miss address is then fetched and stored in the relatively small but high-speed predictive read cache. The next time a data read miss occurs in the primary cache, if the miss address matches one of the predicted miss addresses stored in the cache, then the required data is immediately sent to the primary cache from the predictive cache, rather than having to be read out of the much slower main memory.

DESCRIPTION OF THE PREFERRED EMBODIMENT

Figure 1:
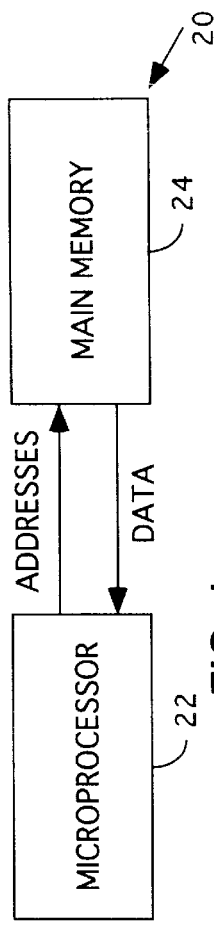
FIG. 1 is a block diagram of a typical prior art microprocessor-memory subsystem interface without cache.

FIG. 1 illustrates a typical microprocessor-memory subsystem interface 20 without a cache memory. In FIG. 1 a microprocessor 22 is connected to a main memory 24 via an address bus and a data bus.

Figure 2:
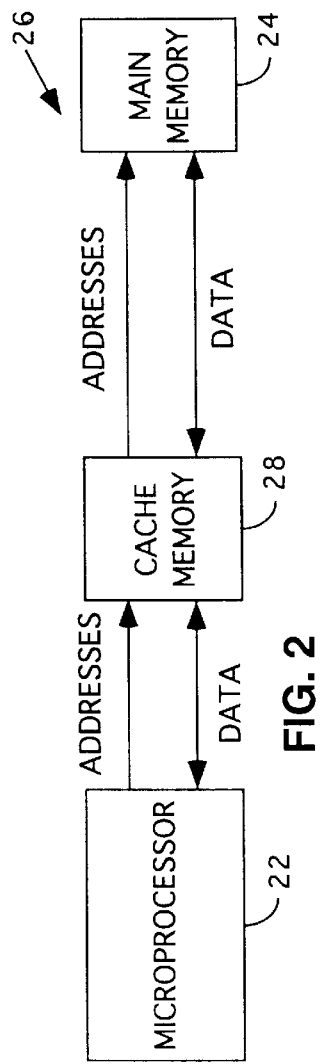
FIG. 2 is a block diagram of a typical prior art microprocessor-memory subsystem interface with cache.

FIG. 2 illustrates a typical microprocessor-memory subsystem interface 26 that includes a cache memory 28 connected between the microprocessor 22 and the main memory 24. The cache memory 28 is typically formed on the same semiconductor chip (not shown) as the microprocessor 22.

Figure 3:
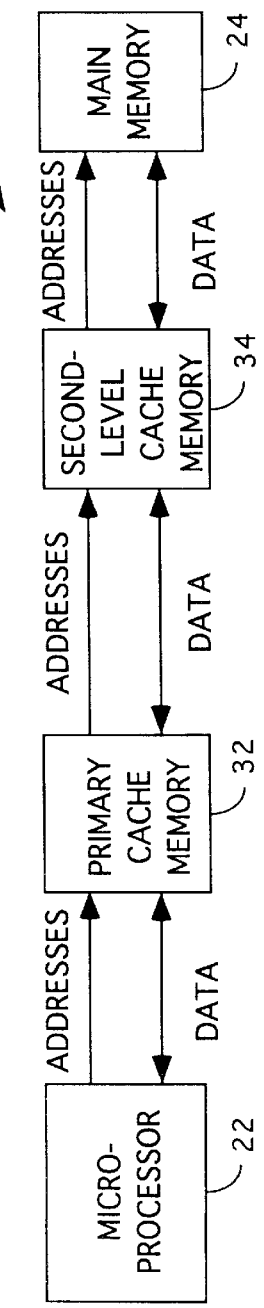
FIG. 3 is a block diagram of a typical prior art microprocessor-memory subsystem interface with both primary and second-level cache.

FIG. 3 illustrates typical microprocessor-memory subsystem interface 30 with both a primary cache memory 32 and a second-level cache 34. The primary cache memory 32 is connected to the microprocessor 22, and the second-level cache memory 34 is connected between the main memory 24 and the primary cache memory 32. The primary cache memory 32 is also typically formed on the microprocessor chip.

Figure 4:
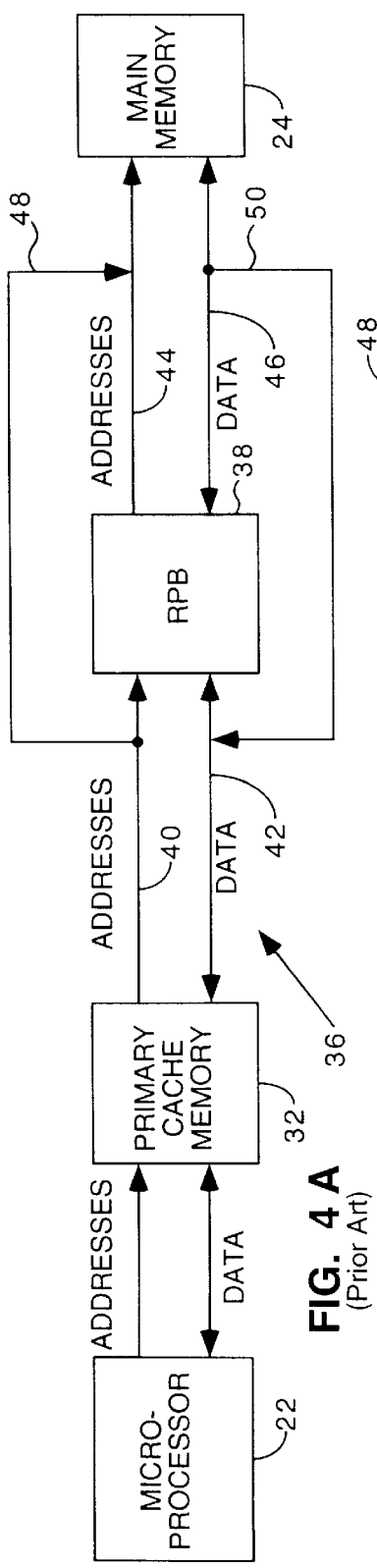
FIG. 4A is a block diagram of a prior art microprocessor-memory subsystem interface with a read prediction buffer.
FIG. 4B is a block diagram of microprocessor-memory subsystem interface with a predictive read cache according to the present invention.
Figure 4:
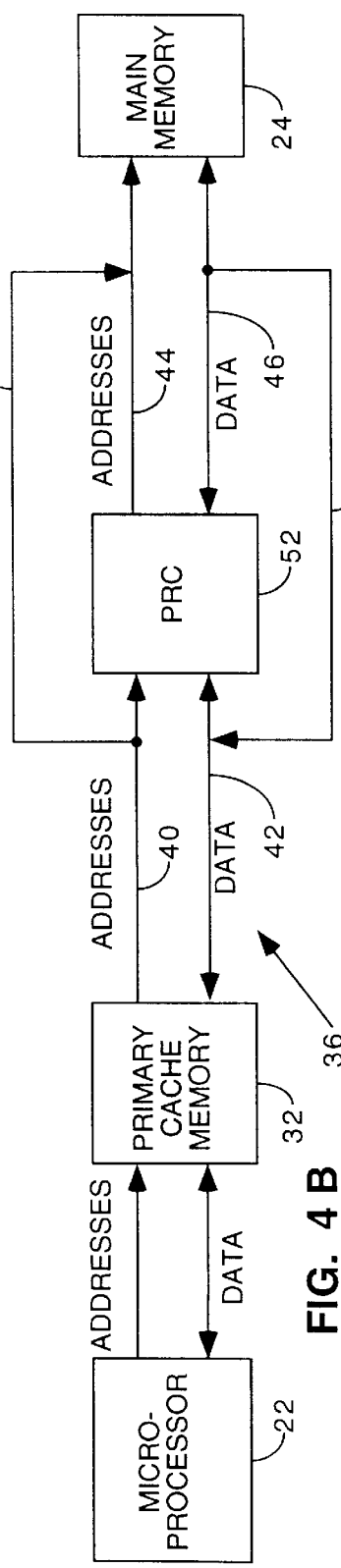

FIG. 4A illustrates a microprocessor-memory interface 36 that includes the primary cache memory 32 connected to the microprocessor 22 and a read prediction buffer (RPB) 38 connected between the main memory 24 and the primary cache memory 32. An address bus 40 and a data bus 42 are connected between the primary cache memory 32 and the RPB 38. Similarly, an address bus 44 and a data bus 46 are connected between the RPB 38 and the main memory 24. An instruction fetch address bypass bus 48 is connected between the address bus 40 and the address bus 44, and an instruction fetch bypass bus 50 is connected between the data bus 42 and the data bus 46.

Referring to FIG. 4B, the present invention replaces the RPB 38 with a predictive read cache (PRC) 52. Suitable structures and methods of operation of the PRC 52 are presented subsequently. An explanation of the functions of the RPB 38 will facilitate understanding of the PRC 52. Additional details of the RPB may be obtained by referring to the following references: (1) G. J. Nowicki. "The Design and Implementation of a Read Prediction Buffer", Masters Thesis, U.S. Naval Postgraduate School, Monterey, Calif., December 1992; (2) M. E. Aguilar, "Testing of the Read Predictive Buffer Chip, Design and Implementation of the Predictive Read Cache Chip", Masters Thesis, U.S. Naval Postgraduate School, Monterey, Calif., March 1995; (3) D. J. Fouts, G. J. Nowicki, and M. E. Aguilar, "A CMOS Read Prediction Buffer IC for Embedded Microprocessor Systems", Journal of Microelectronic Systems Integration, Vol. 5, No. 3, pp. 145–157, 1997; and (4) D. J. Fouts and A. B. Billingsley, "Predictive Read Caches: An Alternative to On-Chip Second Level Cache Memories", Journal of Microelectronic Systems Integration, Vol. 2, No. 2, pp. 109–121, June 1994.

Both the RPB 38 and the PRC 52 are normally situated between the primary cache 32, which is usually implemented on the microprocessor chip, and the main memory, as shown in FIGS. 4A and 4B. The RPB 38 operates by tracking the sequence of data read addresses going from the microprocessor 22 to the main memory 24. For microprocessors with an on-board cache, any off-chip data read operation will, by definition, be the result of a miss in the on-board cache.

Figure 5:
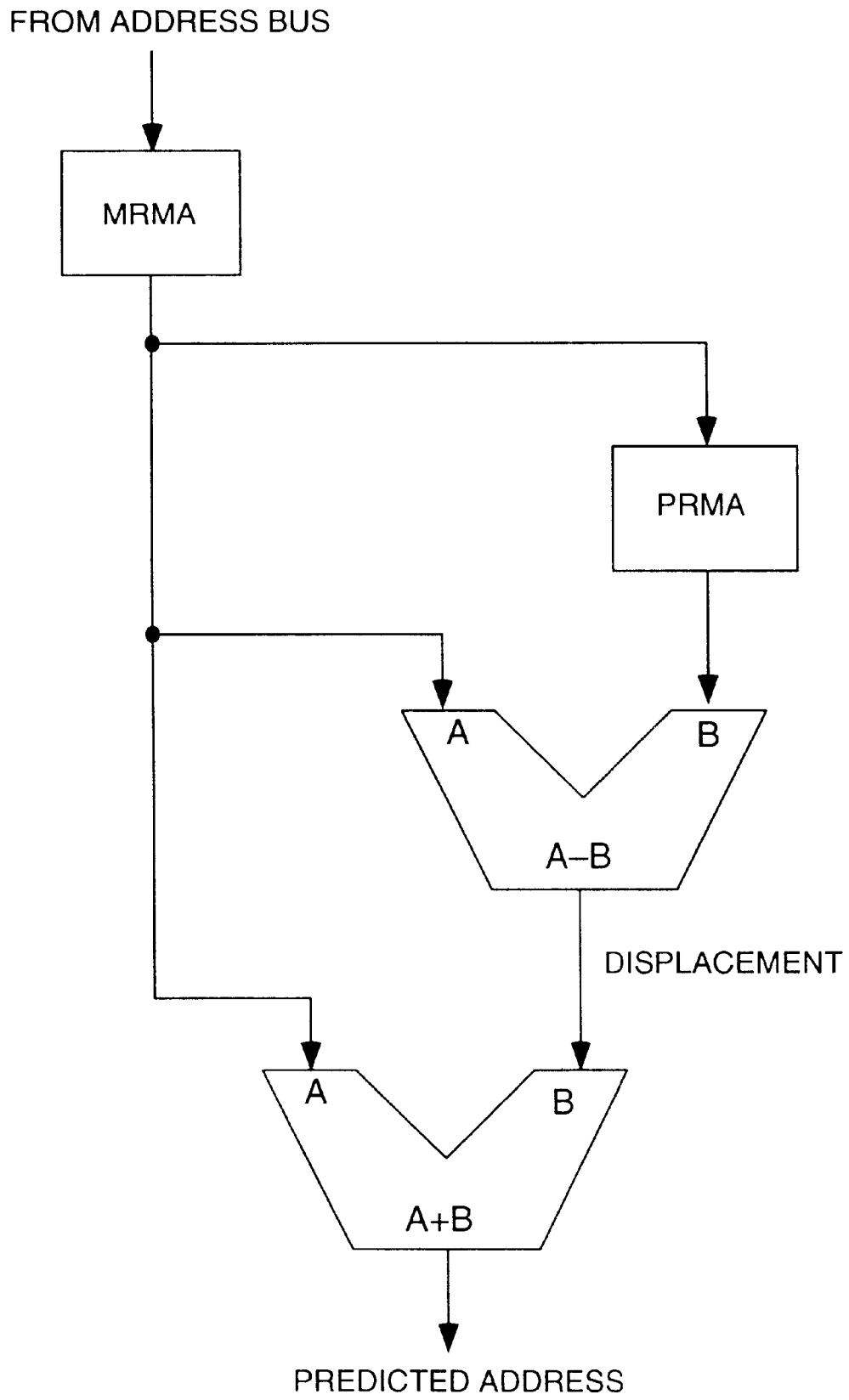
FIG. 5 is a flow chart of a prediction algorithm for the read prediction buffer of FIG. 4A and the predictive read cache of FIG. 4B.

When the RPB 38 tracks an address sequence, it executes the algorithm shown in the flow chart shown in FIG. 5. Initially, a new read address is designated as the most recent memory address, or MRMA. When the next cache data read miss address is obtained, the old MRMA becomes the previous read memory address, or PRMA, and the new address becomes the MRMA. The PRMA is then subtracted from the MRMA to obtain a displacement. The displacement is then added to the MRMA to obtain the predicted address of the next cache data read miss. Once the predicted address has been obtained, the RPB 38 waits for a free memory bus cycle and then initiates a main memory read at the predicted address. When the data is obtained from memory, it is loaded into a high-speed buffer (not shown) along with the predicted address and made ready for sending to the microprocessor 22. When the microprocessor 22 initiates the next data read, the address is compared against the predicted address field in the high-speed buffer. If a match occurs, the contents of the data field in the high-speed buffer are sent to the microprocessor and the predicted address is used as the MRMA for a new address prediction.

The displacement-based algorithm followed by the RPB 38 has several important features. First, and most importantly, the required calculations can always be accomplished during the amount of time between successive cache data read misses. This time can be very short, depending on the characteristics of the microprocessor 22 and the software being executed. Second, the algorithm is demand driven so that if the prediction is wrong, the data at the incorrectly predicted address does not pollute the primary cache memory 32 and reduce performance. Third, the data at the predicted address is read from main memory 24 during a free memory cycle and thus does not use up a significant amount of useful memory bandwidth. Fourth, the displacement-based algorithm can be implemented on a single VLSI IC (not shown). In fact, the number of logic gates required to implement the RPB 38 is small enough such that the entire RPB 38 could conceivably be implemented on the microprocessor 22 chip itself.

However, the RPB 38 has one major disadvantage which limits its effectiveness for many applications. The RPB 38 can track only a single address pattern because it only has one address tracking mechanism and one read prediction data buffer. Therefore, as soon as the microprocessor 22 performs a context switch, such as executing a subroutine call, a trap, or an interrupt handler, the probability that the prediction is incorrect becomes very high. In fact, the probability of an incorrect prediction is very high even if the software just breaks out of an iterative loop within the same context.

Replacing the RPB 38 with the PRC 52 overcomes this problem by incorporating the ability to track multiple cache data read miss address patterns. Furthermore, each cache data read miss address pattern is associated with the specific instruction that generates the miss address pattern, which further improves the probability of a correct prediction.

The PRC 52 simultaneously tracks a greater number of address patterns than the RPB 38. Only one block was allowed in the RPB 38, which is why it can track only one address pattern. In the PRC 52, the number of blocks is n, where n is an even power of 2 and practically ranges from a minimum of about 256 to a maximum of 65,536 or more.

Figure 6:
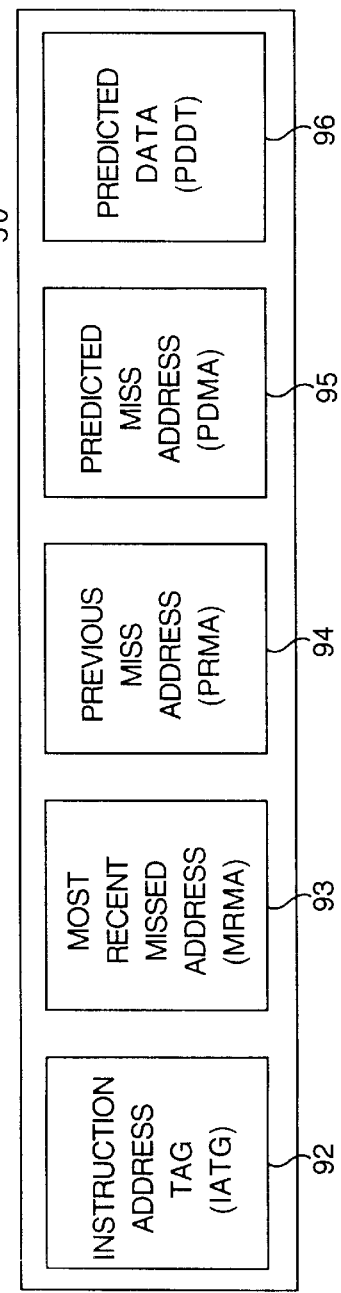
FIG. 6 illustrates fields in each block of the predictive read cache of FIG. 4B.

Referring to FIG. 6, each block still maintains all of the same fields as the single block in the RPB 38, including the most recent miss address (MRMA 93), the previous miss address (PRMA 94), the predicted memory address (PDMA 95), and the predicted data (PDDT 96). In addition, each block of the PRC 52 includes a new field that is not included in a read prediction buffer. The new field stores the most significant bits (MSBs) of the address of the instruction that generated the data read miss address pattern. This new field is referred to as the instruction address tag (IATG 92). The least significant bits (LSBs) of the address of the instruction that generates the data read miss address pattern are used to select a specific block within the PRC 52. The dividing line between which bits of the address are used to select a block and which bits are stored in the IATG depend on the number of blocks in the PRC 52. For a PRC 52 with n blocks, the least significant $\log_2 n$ bits of the instruction address are used to select a block.

The number of bytes that are stored in the PDDT field 96 will usually be an even multiple of the number of bytes in the data word for the microprocessor 22. Typical values range from a minimum of 1 for a small microcontroller to 128 or more for a high-performance microprocessor. The number of bits in the MRMA field 93 and the PRMA field 94 will usually be equal to the number of address bits that the microprocessor 22 uses. The number of bits in the PDMA field 95 will usually be equal to the number of address bits the microprocessor 22 uses less p, where $p=\log_2 q$ where q is the number of bytes that are stored in the predicted data field at each block of the cache, assuming the microprocessor 22 uses byte addressing. The lower p bits of the predicted address are discarded after the address has been used to prefetch the data from the main memory 24 and store it in the PDDT field 96.

The design of the PRC 52 according to the present invention requires some modifications to typical microprocessor architecture. The PRC 52 must be provided with the address of the instruction that causes a data read miss in the primary cache memory 32 in addition to the normally required address of the read data. If the PRC 52 is implemented on a separate chip from the microprocessor 22, then an extra set of output drivers and output pins will be required to send the instruction address to the PRC 52. However, the complexity of the PRC 52 is such that it can be easily implemented on the chip with the microprocessor 22. If the PRC 52 is designed as an on-chip component, the external interface of the microprocessor 22 will not be affected. Only an extra register (not shown) and dedicated internal bus (not shown) for instruction addresses need to be added.

Figure 7:
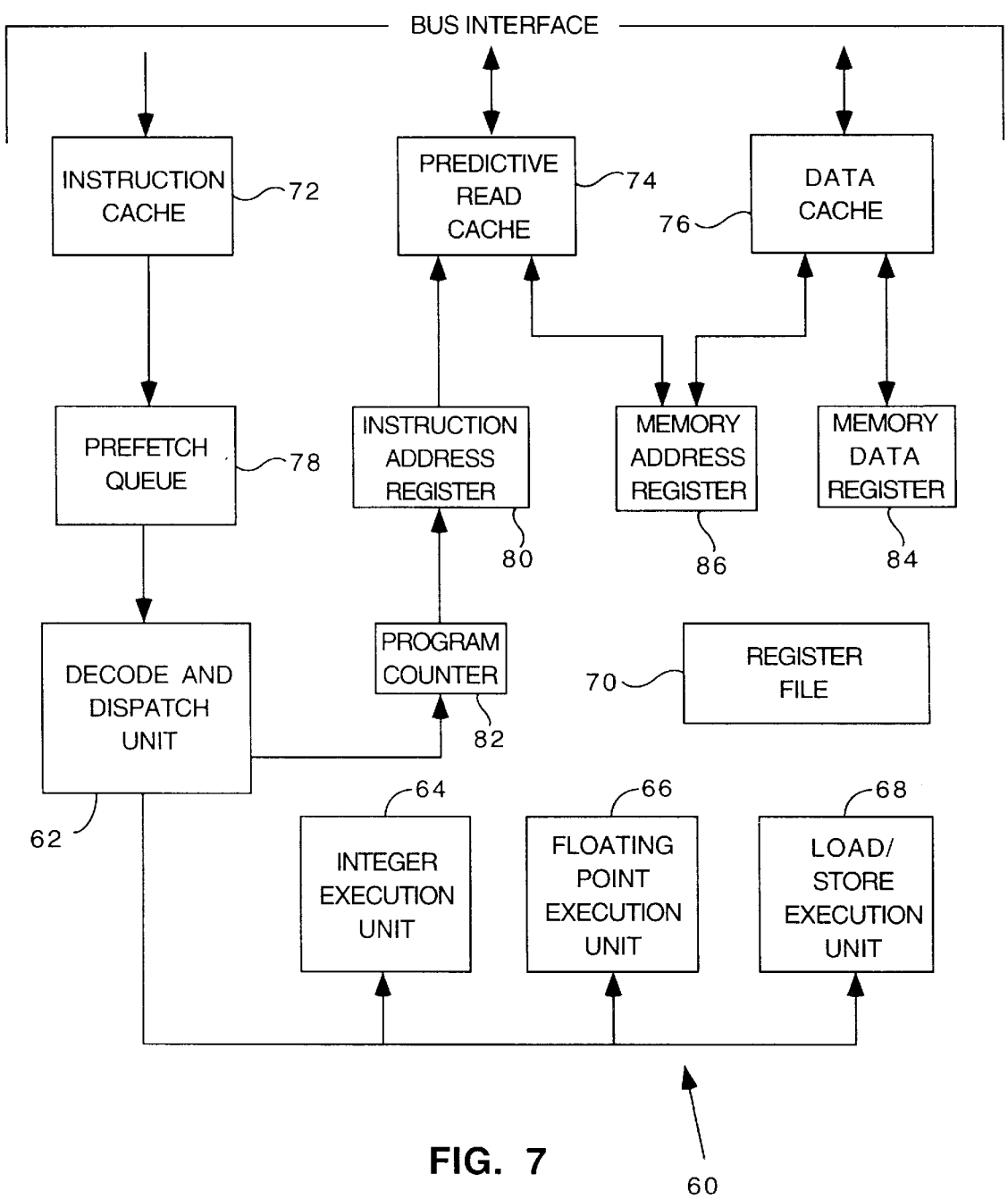
FIG. 7 is a block diagram of a reduced instruction set microprocessor with on-chip predictive read cache according to the present invention.

FIG. 7 shows a block diagram of a reduced instruction set computing (RISC) microprocessor 60 that utilizes on-chip primary instruction and data caches 72 and 76, respectively, and an on-chip predictive read cache 74. The microprocessor 60 shown is assumed to have a decode/dispatch unit 62 and three execution units 64, 66 and 68 operating on a register file 70. A bus interface shown at the top of FIG. 7 provides all of the required off-chip interfaces with the instruction cache 72, the predictive read cache 74 and the data cache 76. A prefetch queue 78 is connected between the decode and dispatch unit 62 and the instruction cache 72.

It can be seen from FIG. 7 that the hardware support required for the PRC 74 can be provided by using an additional instruction address register (IAR) 80 and a dedicated address path connecting the output of the IAR 80 to the PRC 74. A program counter 82 is connected between the IAR 80 and the decode and dispatch unit 62. A memory data register 84 is connected to the data cache 76, and a memory address register 86 is connected to both the data cache 76 and the PRC 74.

Figure 8:
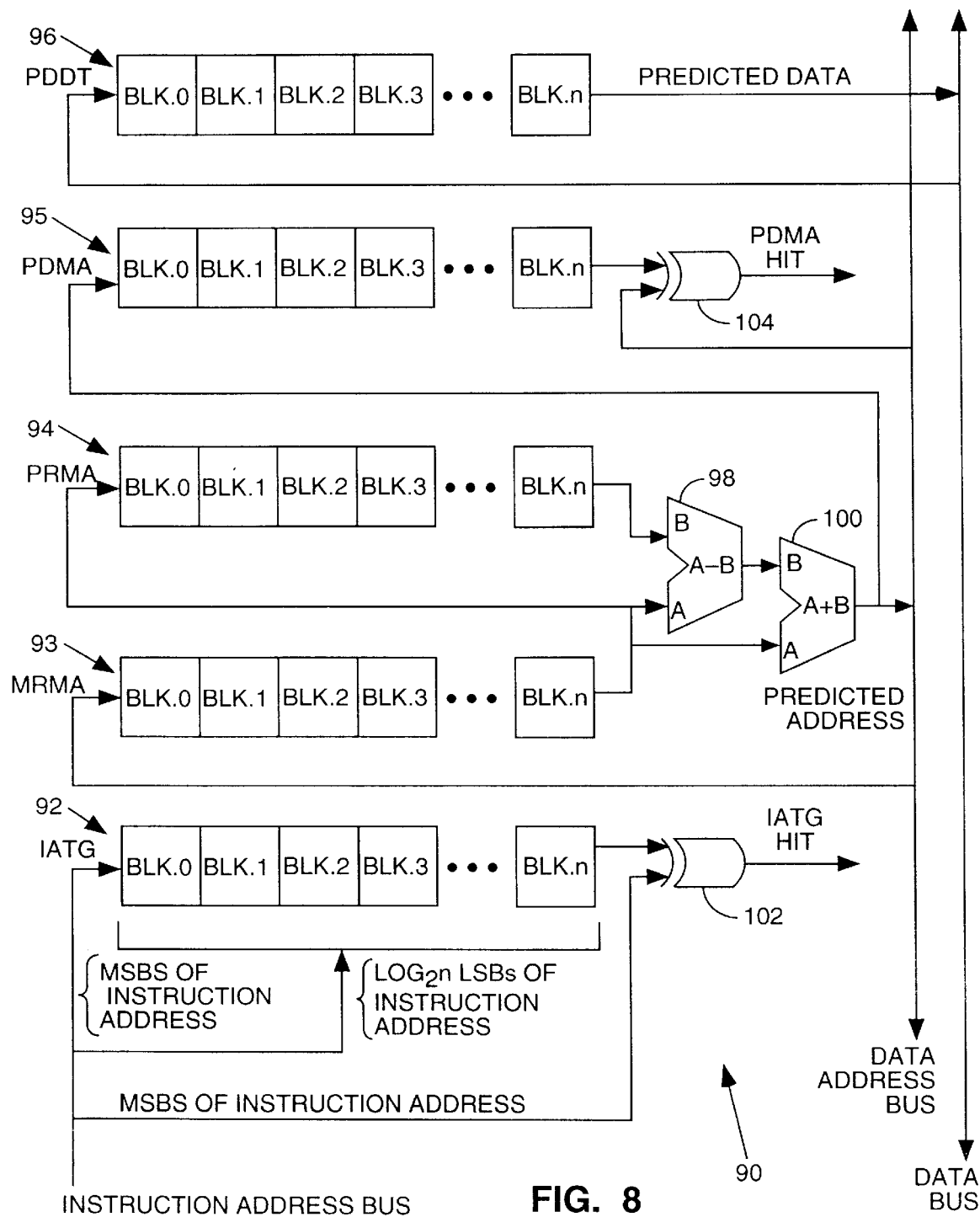
FIG. 8 is a block diagram of a direct-mapped predictive read cache according to the present invention.
Figure 9:
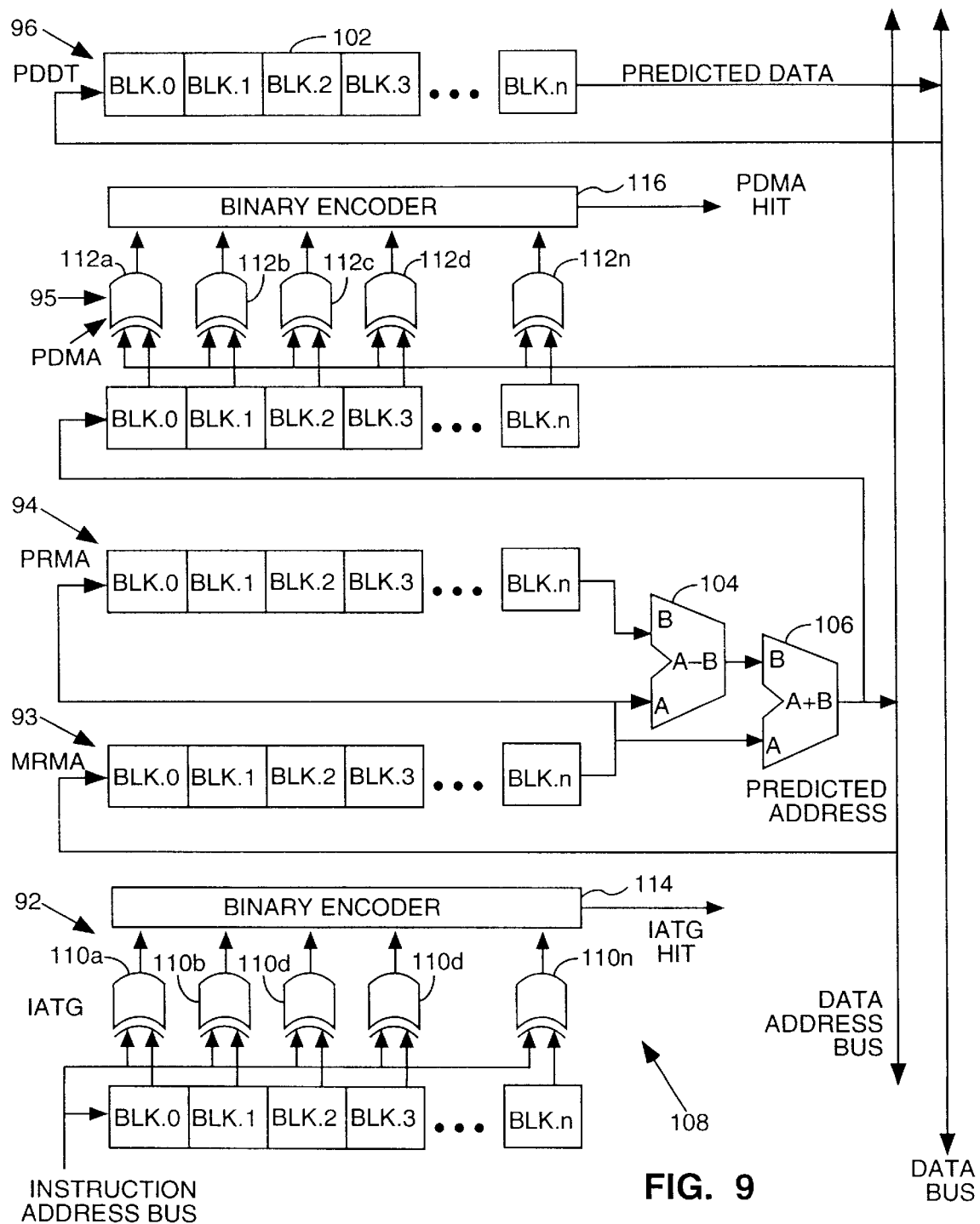
FIG. 9 is a block diagram of a fully associative mapped predictive read cache according to the present invention.
Figure 10:
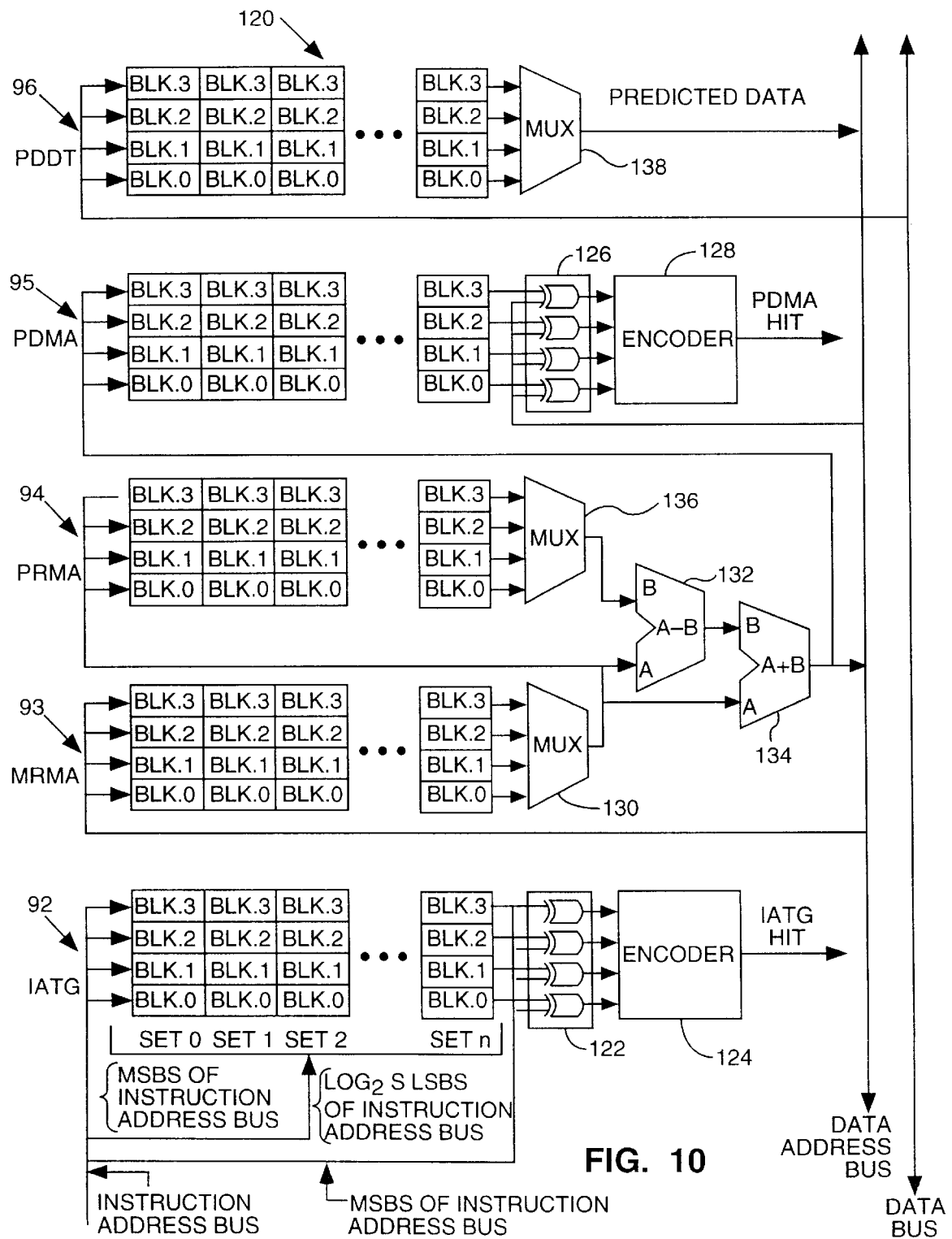
FIG. 10 is a block diagram of a set-associative mapped predictive read cache according to the present invention.

As with most cache memories, three different methods may be used for mapping an address into the PRC 74. These three methods are direct mapping, set-associate mapping, and fully-associative mapping. FIGS. 8–10 are block diagrams showing how these three mapping methods may be implemented. With most cache memories, the mapping method chosen is applied to the address of the data. However, with the PRC 74, the mapping method chosen is applied to the address of the instruction that generates the cache data read miss address because that is the address that is used to select a block out of the PRC 74.

A block diagram of a direct-mapped PRC 90 is shown in FIG. 8. The PRC 90 includes five fields 92–96 of n blocks each, as per FIG. 6. Blocks are designated as BLK0, BLK 1 . . . , BLK n. The IATG field 92 is connected to the instruction address bus. The MRMA field 93 is connected to the data address bus to receive the MRMA. The output of the MRMA field 93 is connected to the A input of a subtracter 98 and the A input of an adder 100. The output of the MRMA field 93 is also connected to the input of the PRMA field 94. The output of the PRMA field 94 in connected to the B input of the subtracter 98. The subtracter 98 combines the output of the PRMA field 94 with the output of the MRMA field 93 to produce a displacement, A–B. The output of the MRMA field 93 is also input A of an adder 100. Input B of the added 100 is the displacement A–B output of the subtracter 98. The output A+B of the adder 100 is the PDMA, which is input to the PDMA field 95. It can also be sent to the main memory 24 on the data address bus. The PDDT field 96 input is connected to the data bus. The output of the PDDT field 96 can also be connected to the data bus.

When the PRC 90 receives a data read miss address from the primary cache 32, it also receives the address of the instruction that generated the memory read. The $\log_2 n$ least significant bits of the instruction address are used to select a specific block within the PRC 90. A comparator 102 compares remaining higher-order bits against the value stored in the IATG field 92 at the selected block.

While this is happening, the data address bits, less the lower-order bits required to select a specific byte within a block, are compared by an address comparator 104 against the value stored in the PDMA field 95 at the selected block. If a match occurs in both the IATG and PDMA fields 92 and 95, respectively, the required data stored in the PDDT field 96 is sent to the primary cache 32 via the data bus. If the data address does not match the PDDT field 96, but the instruction address does match the IATG field 92, then the required data is read from main memory.

After the required data has been sent to the primary cache 32 from either the PRC 90 or the main memory 24, a new prediction is made by moving the MRMA at the selected block into the PRMA and the current address into the MRMA at the selected block. The foregoing sequence of steps executes the same prediction algorithm used by the read prediction buffer 38 and illustrated in FIG. 5. When the main memory 24 is not busy with other transactions, the new predicted address is used to perform a main memory read. The resulting data is stored in the PDDT field 96, and the higher-order bits of the predicted address are stored in the PDMA field 95, both at the selected block.

When checking an incoming data read miss address from the primary cache 32, it is possible that a match will be found with the address in the PDMA field 95 but not in the IATG field 92. This situation is possible because different modules in the executing program may access the same data structures. In this situation, the data in the PDDT field 96 can still be forwarded to the primary cache 32. However, a prediction of the next data read miss address does not need to be done because the current data read miss address was generated by a different instruction than the one represented in the selected block of the PRC 90. The only actions that are taken are to load the current data address into the MRMA field 93 and the higher-order bits of the instruction address into the IATG field 92.

It is also possible that both the instruction address does not match against the IATG 92 and the data read miss address does not match against the PDMA 95. In this case, the required data is fetched from main memory 24. Again, no new prediction is done because the data read miss address was generated by a different instruction than the one represented in the selected block of the PRC 90. In this case, the only actions that are taken are to load the current data address into the MRMA 93 and the higher-order bits of the instruction address into the IATG 92.

Although the PRC 90 is designed to improve the average memory access time during data read operations, it cannot ignore write operations. If write operations are ignored, data in the PRC 90 could become stale. The PRC 90 can use any of the write policies normally used for cache memories, write through, write invalidate (write around), and write back However, write back is not recommended because it could be a very long time between when the PRC 90 is written and when a block is flushed out of the cache 32 and main memory 24 is updated. This is especially true for the set-associative and fully-associative mapped PRC designs described subsequently. Therefore, to maintain consistency between the PRC 90 and main memory 24, either write-through or write-invalidate policies are preferred, especially in multiple CPU systems.

With the direct-mapped PRC 90 described with reference to FIG. 8, it is possible for two or more frequently-executed instructions with different addresses to have the same least significant address bits. When this occurs, the multiple address patterns tracked by the PRC 90 will get mapped to the same block. This is undesirable because only one tracked address pattern can actually reside in a cache block at one time. When this situation occurs, one tracked address pattern will be immediately replaced by another tracked address pattern which will immediately be replaced by another tracked address pattern, possibly the first tracked address pattern. This is known as thrashing. A way to prevent thrashing, at the expense of increased hardware and design complexity, is to use fully-associative mapping.

With fully-associative mapping, the instruction address bus is not divided into two parts, as shown in FIG. 8, for selecting a block out of the cache and for comparing against the IATG. Instead, all bits of the instruction address are simultaneously compared against the IATG fields in all of the blocks in the cache.

FIG. 9 illustrates a fully-associate mapped PRC 108. Note that the fully-associate mapped PRC 108 includes a separate address comparator 110a, 110b, . . . , 110n in the IATG field 92 for each block BLK.0, BLK.1, . . . , BLK.n, respectively. The fully-associate mapped PRC 108 shown in FIG. 9, also includes n comparators labeled 112a, 112b, . . . , 112n for the PDMA field 95 in every block of the PRC 108. The outputs of the comparators 110a, 110b, . . . , 110n are input to a binary encoder 114, which produces the IATG hit output. Similarly the outputs of the comparators 112a, 112b, . . . , 112n are input to a binary encoder 116, which produces the PDMA hit output.

The comparators 110a, 110b, . . . , 110n and 112a, 112b, . . . , 112n for the IATG and PDMA fields respectively, along with the method of handling the instruction address, allow a tracked address pattern to be stored in any block of the PRC 108 and still be located rapidly when a data read miss occurs in the primary cache 32.

Still referring to FIG. 9, when a data read miss occurs in the primary cache 32, both the data address and the address of the instruction that generated the data read miss are simultaneously compared against the PDMA and IATG fields in all blocks of the PRC 108. If both IATG field and PDMA field hits occur, the correctly predicted data is sent to the primary cache 32, and a new prediction is done. The new predicted address and the new predicted data, once read from main memory, are stored at the same block in the cache 32 where the previous correct prediction was found. If there is a hit in the PDMA field 95 but a miss in the IATG field 92, then the correct data has been located in the PRC 108, but the data is associated with another address pattern being tracked by the PRC 108 for another instruction. In this case, the correct data is sent to the primary cache 32. Then, a new block in the cache 32 is used to start tracking the new address pattern.

If a miss occurs with the PDMA 95, it means that no predicted data is available in the PDDT field 96 in any block of the PRC 108. In this case, a read from main memory 24 must be performed and the data obtained sent to the primary cache 32. If the PDMA field miss is accompanied by an IATG field hit, then a new prediction is attempted. The new predicted address and data are stored in the block where the IATG field hit occurred. However, if the PDMA field miss is accompanied by an IATG field miss, then a new block in the cache 32 must be obtained and a new address pattern tracked.

When a new block is required to track a new address pattern, any previously unused block can be used because of the additional comparators available and the ability of a fully-associative PRC 108 to simultaneously search all blocks in both the IATG field 92 and the PDMA field 95. However, there will be times when a new address pattern needs to be tracked, but there are no unused blocks available. This same situation can also occur in conventional, fully-associative mapped, demand-driven caches that only use the data address for finding the correct block in the cache. As with a conventional cache, any of the normally-used block replacement algorithms can be used to select a victim block, including random, least recently used (LRU), first in first out (FIFO), working set, etc. With respect to write operations, the fully-associative mapped PRC 108 is no different than the direct-mapped PRC 90. The write-through, write-invalidate (write-around), and write-back policies can all be used, although the write-back policy is not recommended.

An advantage of the fully-associative PRC 108 design is that any tracked address pattern can be stored in any block of the cache. This eliminates most of the thrashing that can occasionally occur with the direct-mapped PRC 90. However, the fully-associative PRC 108 design has high hardware costs, relative to a direct-mapped PRC 90, because comparators are required for both the IATG field 92 and the PDMA field 95 at every block of the PRC 108.

The direct-mapped and the fully-associate mapped designs can be combined to obtain performance nearly as great as the performance of the fully-associative mapped PRC 108 at a hardware cost that is only slightly higher than that of the direct-mapped PRC 90. The combined design is referred to as a set-associative mapped PRC. A block diagram of a 4-way, set-associative mapped PRC 120 is shown in FIG. 10.

Referring to FIG. 10, all blocks in the PRC 120 are grouped into sets, which are identified as SET 0, SET 1, SET 2, . . . , SET n The number of blocks in each set is an even power of two, such as 2, 4, or 8. In the exemplary embodiment of FIG. 10, the set size is 4.

A comparator array 122 is connected between the IATG 92 and an encoder 124. The output of the encoder 124 indicates an IATG hit. Similarly, a comparator array 126 is connected between the PDMA 95 and an encoder 128.

A multiplexer 130 is connected to the output of the MRMA 93. The output of the multiplexer 130 is input A of a subtracter 132 and an adder 134. The output of the PRMA 94 is input to a multiplexer 136, which provides an input B to the subtracter 132. The output displacement A−B of the subtracter 132 is input B to the adder 134 which provides the predicted address to the data address bus and to the PDMA 95. The comparator array 126 is connected to the data address bus to receive data addresses for comparison with addresses output from the PDMA 95. If the comparator array 126 detects a match, then the encoder 128 outputs a signal indicating a PDMA hit.

A multiplexer 138 is connected to the outputs of the PDDT 96. The multiplexer 138 provides the predicted data to the data bus.

The $\log_2 s$ least significant bits of the address of the instruction that generated the cache data read miss are used to select one of the sets in the PRC 120, where s is the total number of sets in the PRC. Therefore, once a set has been selected, the desired address pattern can be tracked only by one of the blocks in the selected set. This limits the number of parallel comparisons that need to be executed in the IATG field 92 and the PDMA field 95 to the number of blocks in a set, or 4 for the embodiment shown in FIG. 10. For the IATG field 92, the most significant bits of the instruction address are compared against the IATG fields of all blocks in the selected set. For the PDMA field 95, assuming byte addressing, all data address bits, less the least significant bits that are used to select a byte within a block, are compared against the predicted address in the PDMA field 95. The comparison is done in parallel with all blocks in the selected set.

If a hit occurs in both the IATG field 92 and the PDMA field 95, then the block with the hit is identified, and the correctly predicted data is forwarded to the primary cache 32. A new address prediction is then performed and stored in the selected block. The data is fetched when the main memory 24 is not busy and is also stored in the PDDT field 96 at the selected block. If a hit occurs in the IATG field 92 but not in the PDMA field 95, then the address pattern is being tracked by the block that produced the IATG hit, but the predicted address was incorrect. Therefore, a read from main memory 24 must be performed. Once the read has been completed, a new predicted address can be calculated and stored in the selected block. When the main memory 24 is not busy, the data at the predicted address can be read from memory and stored in the PDDT field 96 at the selected block.

If a miss occurs in all IATG fields in the selected set but a hit occurs in one of the PDMA fields, then the required data has been located in the PRC 120 and can be forwarded to the primary cache 32. However, the miss in the IATG field indicates that the selected block is not actually tracking the address pattern generated by the current instruction being processed. Therefore, an unused block within the selected set must be used to track the new address pattern. If a miss occurs in both the IATG field 92 and the PDMA field 95 in all blocks of the selected set, then the required data must be read from the main memory 24. Once the required data has been obtained from the main memory 24 and forwarded to the primary cache 32, an unused block within the selected set must be used to track the new address pattern.

It is possible for all blocks within a select set to be in use tracking other address patterns at a point in time when a new address pattern is identified and needs to be tracked. In this case, one of the older address patterns must be deleted from one of the blocks within the select set. The block to be removed can be selected with any of the victim block selection algorithms commonly used with standard, demand-driven, set-associate, cache memories that are addressed using only the data address. Algorithms that will work include random, least recently used, first in first out, working set, etc.

The present invention has several significant advantages over the prior art. One such advantage is reduced average access time to memory. Research has been conducted to quantify the improvement in performance that can be attained by using a predicitve read cache according to the present invention in a memory hierarchy. The study was conducted using a highly accurate, address-trace driven, simulation program that utilizes an analytic model and actual address traces captured from executing benchmark programs.

Two benchmark programs that are indicative of the performance improvement that can be attained from using a PRC according to the present invention are the Kenbus20 and Kenbus80 benchmarks. These programs are part of a standardized set of benchmark programs known as the SPECmark suite and represent a typical work load for a computer in a multi-user environment with 20 users for the Kenbus20 benchmark and 80 users for the Kenbus80 benchmark. Using these benchmarks, the baseline performance of a RISC-type CPU with a primary cache 32 memory but no second-level cache or predictive read cache is given in Table 1, which is appended to this description of the invention.

A fully-associative mapped predicitve read cache was modeled in the simulator with an analytic model. Simulations were then performed using the address traces obtained from executing Kenbus20 and Kenbus80 benchmark programs. The fully-associative mapped design produced the best performance improvement, as can be seen in Table 2. In Table 2, the average read access time, the speedup percentage, and the PRC read hit rate are listed for PRC sizes of 256 bytes to 512 Kbytes. It should be noted that 256 bytes is an extremely small size compared to the size of a typical second-level cache and represents a tremendous hardware savings. Yet, the 256 byte PRC yielded an 18.82% speedup in performance for the Kenbus80 benchmark and a 12.58% speedup for the Kenbus20 benchmark. A 512 Kbyte fully-associative cache is extremely large and represents a very large hardware investment. This much larger PRC yielded performance improvements of 20.19% on the Kenbus80 benchmark and 14.32% on the Kenbus20 benchmark.

The design of a 4-way, set-associative PRC was also modeled using an analytic model in the simulation study. Its performance was also studied using actual address traces from various different executing benchmark programs. For the Kenbus20 and Kenbus80 benchmarks, the results of the simulation study are given in Table 3. As can be seen from Table 3, the performance improvement attained by using a set-associative PRC is not as great as the performance improvement attained using a fully-associative PRC. However, the hardware costs of a 4-way, set-associative mapped PRC are less than for a fully-associative mapped PRC because of the reduced number of required comparators. Also, the victim block selection algorithm needs only to select between the various different blocks in the selected set, rather than between all blocks in the cache. Referring to Table 3, a 256-byte PRC yields a speedup of 10.39% for the Kenbus80 benchmark and a speedup of 8.10% for the Kenbus20 benchmark. For a 512 K byte, 4-way, set-associative PRC, the speedup is 18.78% for the Kenbus80 benchmark and 12.77% for the Kenbus20 benchmark. It should be noted that the different size set-associative PRCs listed in Table 3 all have reasonable hardware costs, relative to both fully-associative PRCs and second-level caches.

As mentioned previously, the best prior art method for reducing cache miss latency is to utilize a second-level cache. For comparison purposes, the performance improvement that can be attained by using a second-level cache together with a RISC-type CPU and a primary cache 32 was also studied by a simulation study. The second-level cache utilized an analytical model and the same address traces from the same benchmark programs as were used for simulating the predictive read cache designs. The results of the simulations that use the address traces from the Kenbus20 and Kenbus80 benchmarks are recorded in Table 4.

Referring to Table 4, a 64 Kbyte, second-level cache provides a 3.88% speedup for the Kenbus80 benchmark and a 0.50% speedup for the Kenbus20 benchmark. This is significantly less than what is provided by even the smallest predictive read cache. The 256 byte, fully-associative PRC provided an 18.82% speedup for the Kenbus80 test case and a 12.58% speedup for the Kenbus20 test case. Even the 4-way, set-associative, 256-byte PRC provided significantly better speedup than the second-level cache. The set-associative design provided a speedup of 10.39% for the Kenbus80 benchmark and 8.10% percent for the Kenbus20 benchmark. It should be noted that the hardware costs for a 256-byte PRC is significantly less than for a 64 Kbyte second-level cache, even if the PRC is fully-associative mapped.

The characteristics of the PRC are such that as the number of bytes in the PRC increases, the speedup provided by the PRC rapidly increases up to a point and then further increases are minimal. The characteristics of a second-level cache are such that as the number of bytes increases, the speedup provided slowly but continuously increases. Eventually, the performance of the second-level cache exceeds that of the PRC. However, the performance of a second-level cache does not exceed that of a fully-associative PRC until the size of the caches is 512 Kbyte for the Kenbus20 benchmark and 256 Kbytes for the Kenbus80 benchmark. The performance of a second-level cache does not exceed that of a 4-way, set-associative PRC until the size of the caches is 256 Kbytes for both the Kenbus20 and the Kenbus80 benchmarks. For embedded microprocessor systems performing high-speed control and communications functions in space-based, weapon-based, and portable, mobile, and aeronautical computing applications, the physical size, weight, power consumption, and generated heat of a 256 Kbyte to 512 Kbyte, second-level, cache memory can be prohibitive.

The present invention has the added advantage of providing decreased hardware costs. In addition to studying the performance of various different PRC designs, the hardware costs of various different PRC designs have been studied. The cost of computing hardware, including component costs, assembly costs, design and test costs, etc., is directly proportional to the number of transistors required to implement the required logic functions. This is especially true for VLSI components. Table 5 summarizes the results of this study for 256 byte through 64 Kbyte PRCs. Transistor counts are given for direct-mapped, 4-way set-associative mapped, and fully-associative mapped PRCs.

The hardware costs, in number of transistors, for a typical second-level cache are approximately one-third of the hardware costs of a direct-mapped PRC for caches with the same number of blocks and bytes per block. Upon initial inspection, this would tend to indicate that a PRC does not have a hardware cost advantage over a standard, second-level cache. However, it is not reasonable to directly compare second-level caches against PRCs of the same size except for very large caches. The appropriate comparison to make is to compare a given PRC design against the second-level cache design that yields the same performance improvement. If this is done, it will be seen that for practical cache sizes, the hardware costs of a PRC are usually significantly lower than the hardware costs of the second-level cache that provides the same performance improvement. For example, referring to Tables 2, 4, and 5, it can be seen that a fully-associative mapped PRC with only 256 bytes provides better speedup than a 128 Kbyte second-level cache. A second-level cache would have to have 256 Kbytes to have better performance than the 256-byte, fully-associative mapped PRC which would require approximately 270 times the number of transistors.

Referring to Tables 3, 4, and 5, a 4-way, set-associative mapped PRC that is 1 Kbyte in size provides better performance than a 128 Kbyte second-level cache. The second-level cache would need to have 256 Kbytes in order to provide better performance than the PRC. This would require approximately 77 times the number of transistors in a 1 Kbyte 4-way, set-associative PRC.

The present invention also allows decreased power consumption in comparison to second-level cache memories. In a space-based, weapon-based, portable, mobile, or aeronautical computing system, minimizing power consumption is often a critical issue for two reasons. First, for many such systems, the only available power to operate the computer comes from batteries, solar cells, or other means that are not capable of producing large amounts of power. Second, the integrated circuits used to construct computers convert most of the consumed electrical energy into heat energy which must then be dissipated from the system. Although this is not a difficult engineering problem in a desktop computer, it can be an extremely limiting factor in certain applications such as space-based computers where convection cooling is not possible and all cooling must be accomplished by radiation.

The power consumed by a digital integrated circuit is dependent on the frequency of operation, the power supply voltage, the type of logic circuit, and the total parasitic capacitance of the chip. When comparing the power consumption of a PRC against the power consumption of a second-level cache, it is reasonable to assume that both will be implemented with the same fabrication and logic circuit technology. Therefore, it is reasonable to assume that the power supply voltage of a PRC would be the same as that of a second-level cache. It has been shown that both a PRC and a second-level cache will improve the speed of operation of a computer. However, this speed increase is not the result of an increase in the clock rate, or operating frequency. As indicated in Tables 2, 3, and 4, both the PRC and the second-level cache improve performance by reducing the number of clocks required to fetch data. Therefore, when comparing the power consumption of a PRC against the power consumption of a second-level cache, it is reasonable to assume that the frequency of operation will be the same for both.

It can be shown that the total parasitic capacitance of an integrated circuit is approximately linearly proportional to the number of transistors used to implement the chip. Therefore, if a PRC and a second-level cache are implemented with the same fabrication and logic circuit technology and operate at the same frequency, then the design that uses the fewest transistors will consume the least power with the ratio of the power consumptions being approximately proportional to the ratio of the number of transistors. It has been mentioned previously that the PRC uses significantly fewer transistors than do second-level caches of equivalent performance. For second-level caches and PRCs of approximately equivalent performance, transistor ratios of 77/1 to 270/1 are possible. Thus, the power consumption of a PRC can be as low as 1/77 to 1/270 that of a second-level cache memory of equivalent performance.

The present invention provides an increased level of integration. The level of integration of a digital system refers to the number of different logic functions that can be placed on a single chip. The more functions on a given chip, the higher the integration level, the higher the performance, the higher the reliability, the lower the power consumption, and the lower the manufacturing costs. It has been shown that the number of transistors required to implement a PRC is 1/77 to 1/270 the number of transistors required to implement a second-level cache of approximately equal performance. Thus, what would have required a VLSI controller chip and an array of high-speed static random access memory ICs, can be accomplished with a single VLSI integrated circuit, the PRC. However, based on the transistor counts required to actually implement a PRC, as shown in Table 5, and taking into consideration current VLSI fabrication technology which is capable of producing ICs with over 10 million transistors with high yield, it is now feasible to implement an entire PRC as an integral part of the microprocessor chip. Thus, the use of a PRC would completely eliminate the need for any memory-related ICs outside the microprocessor chip, except for the main memory which is usually implemented with low-power, low-speed, DRAM ICs.

The advantages of the present invention are achieved by providing several new features. These new features include a predictive read cache memory that tracks multiple data read miss address patterns from the primary cache memory and the use of a displacement-based algorithm for tracking multiple data read miss addresses patterns from the primary cache memory. Another new feature is the association of the multiple data read miss address patterns from the primary cache with the specific instructions that generate the patterns. Still another advantage of the predictive read cache memory according to the present invention is identification of instructions that generate the data read miss address patterns from the primary cache by using the addresses of the instructions that generate the patterns. The use of the least significant bits of the instruction address that generates a data read miss in the primary cache to select a block in the predictive read cache memory and the most significant bits to compare against a tag stored in the block is also a new feature.

One design alternative that is possible for the PRC is to reverse the rolls of the instruction address and the data address. For example, referring to FIG. 8, the least significant $\log_2 n$ bits of the data read miss address from the primary cache 32 could be used to select a block in the PRC 90. The higher-order bits of the data address would then become a tag and would be used in a manner similar to the way the instruction address tag is used in FIG. 8. If this design were used, the address of the instruction generating the data read miss address pattern would need to be used in a manner similar to that of the data address in FIG. 8. The entire instruction address would have to be stored in a field in each block. When checking to see if an incoming primary cache 32 data read miss address had been correctly predicted, the incoming instruction address would need to be compared against the value stored in the instruction address field in the selected block. This alternative method of selecting a block in the cache is compatible with all three possible methods for implementing address mapping as described previously.

Figure 11:
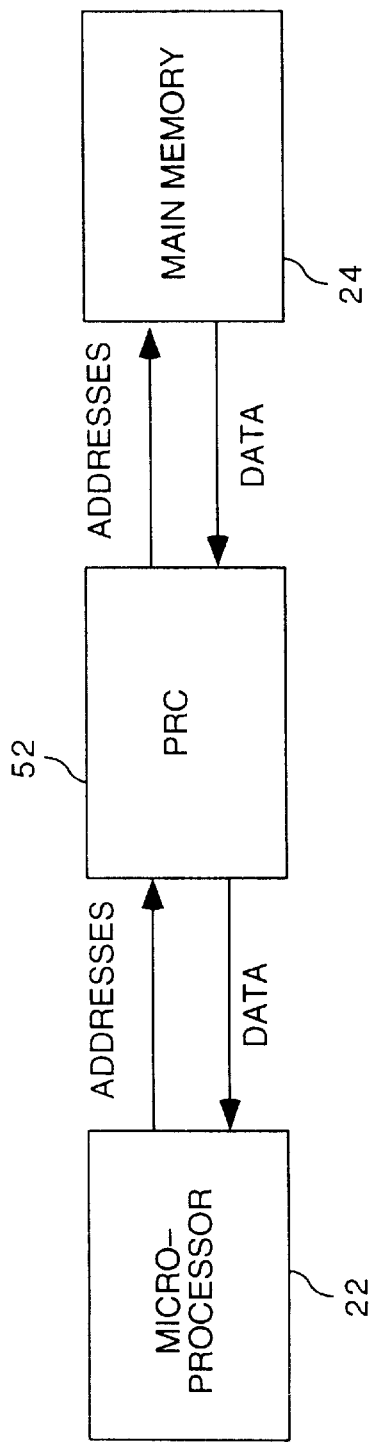
FIG. 11 is a block diagram of an alternative memory subsystem architecture that has a predictive read cache according to the present invention and no primary cache memory.

Other memory subsystem architectures are possible using the predictive read cache. For example, referring to FIG. 11, the primary cache 32 memory could be completely eliminated and the predictive read cache 52 could be connected between the microprocessor 22 and the main memory 24.

Figure 12:
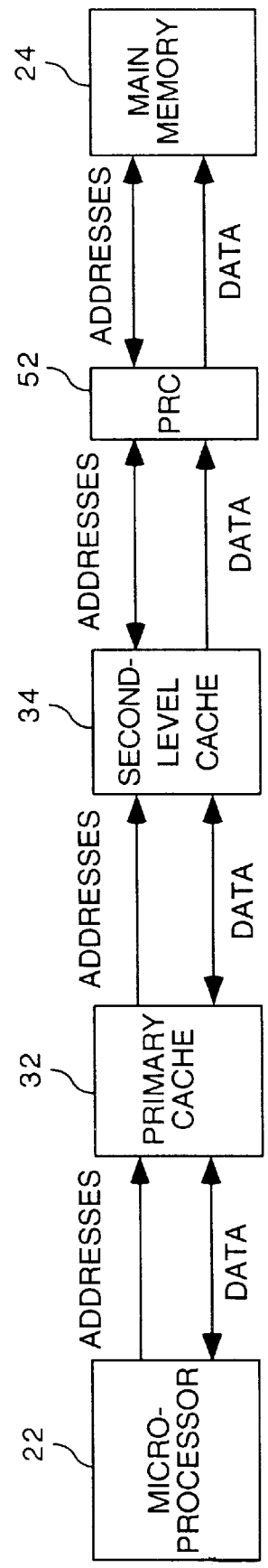
FIG. 12 is a block diagram of an alternative memory subsystem architecture that includes a primary cache, a second-level cache and a predictive read cache.

In another architecture, the predictive read cache 52 could be logically situated between the main memory 24 and the second-level cache 34 as shown in FIG. 12. Essentially, a predictive read cache according to the present invention can be placed anywhere in the memory hierarchy, although research has indicated that it provides the best performance improvement if used along with a primary cache as a replacement for a second-level cache.

APPENDIX

TABLE 1

Baseline Performance of RISC CPU With Primary Cache Only

| Benchmark | Average Read Access Time (clocks) | Cache Read Hit Rate | Average Write Access Time (clocks) | Cache Write Hit Rate |
|---|---|---|---|---|
| Kenbus 20 | 1.513 | 89.94% | 1.00 | 64.32% |
| Kenbus 80 | 1.721 | 86.44% | 1.00 | 63.9% |

TABLE 2

Performance of RISC CPU With Primary Cache and Fully-Associative Mapped PRC

| | Kenbus 20 | | | Kenbus 80 | | |
|---|---|---|---|---|---|---|
| PRC Size (bytes) | Ave. Read Access Time (clocks) | Speed-up | PRC Read Hit Rate | Ave. Read Access Time (clocks) | Speedup | PRC Read Hit Rate |
| 256 | 1.323 | 12.58% | 37.49% | 1.397 | 18.82% | 42.61% |
| 512 | 1.317 | 12.94% | 38.40% | 1.393 | 19.04% | 43.08% |
| 1K | 1.314 | 13.19% | 39.15% | 1.391 | 19.18% | 43.68% |
| 2K | 1.312 | 13.31% | 39.57% | 1.390 | 19.25% | 44.05% |
| 4K | 1.311 | 13.37% | 39.94% | 1.389 | 19.28% | 44.29% |
| 8K | 1.309 | 13.47% | 40.40% | 1.387 | 19.39% | 44.80% |
| 16K | 1.306 | 13.65% | 41.11% | 1.383 | 19.64% | 45.63% |
| 32K | 1.302 | 13.95% | 42.30% | 1.375 | 20.10% | 47.09% |
| 64 | 1.297 | 14.27% | 43.54% | 1.374 | 20.19% | 47.39% |
| 128 | 1.296 | 14.32% | 43.70% | 1.374 | 20.19% | 47.39% |
| 256 | 1.296 | 14.32% | 43.70% | 1.374 | 20.19% | 47.39% |
| 512 | 1.296 | 14.32% | 43.70% | 1.374 | 20.19% | 47.39% |

TABLE 3

Performance of RISC CPU With Primary Cache and 4-Way, Set-Associative Mapped PRC

| | Kenbus 20 | | | Kenbus 80 | | |
|---|---|---|---|---|---|---|
| PRC Size (bytes) | Ave. Read Access Time (clocks) | Speed-up | PRC Read Hit Rate | Ave. Read Access Time (clocks) | Speedup | PRC Read Hit Rate |
| 256 | 1.390 | 8.10% | 26.84% | 1.542 | 10.39% | 25.71% |
| 512 | 1.390 | 8.15% | 27.10% | 1.542 | 10.42% | 25.93% |
| 1K | 1.324 | 12.47% | 36.92% | 1.399 | 18.71% | 42.30% |
| 2K | 1.320 | 12.73% | 37.75% | 1.398 | 18.79% | 42.61% |
| 4K | 1.320 | 12.76% | 37.73 | 1.398 | 18.76% | 42.70% |
| 8K | 1.320 | 12.75% | 37.81% | 1.398 | 18.74% | 42.78% |
| 16K | 1.320 | 12.76% | 37.89% | 1.398 | 18.75% | 42.90% |
| 32K | 1.320 | 12.76% | 37.96% | 1.398 | 18.77% | 43.03% |

TABLE 3-continued

Performance of RISC CPU With Primary
Cache and 4-Way, Set-Associative Mapped PRC

| PRC Size (bytes) | Kenbus 20 | | | Kenbus 80 | | |
|---|---|---|---|---|---|---|
| | Ave. Read Access Time (clocks) | Speed-up | PRC Read Hit Rate | Ave. Read Access Time (clocks) | Speedup | PRC Read Hit Rate |
| 64 | 1.320 | 12.76% | 37.98% | 1.398 | 18.78% | 43.07% |
| 128 | 1.320 | 12.76% | 37.99% | 1.398 | 18.78% | 43.08% |
| 256 | 1.320 | 12.76% | 37.99% | 1.398 | 18.78% | 43.07% |
| 512 | 1.320 | 12.76% | 37.99% | 1.398 | 18.78% | 43.07% |

TABLE 4

Performance of RISC CPU With Primary and
Second-Level Cache Memories

| Cache Size (Kbytes) | Kenbus 20 | | Kenbus 80 | |
|---|---|---|---|---|
| | Average Read Access Time (clocks) | Speedup | Average Read Access Time (clocks) | Speedup |
| 64 | 1.505 | 0.50% | 1.654 | 3.88% |
| 128 | 1.414 | 6.54% | 1.485 | 13.70% |
| 256 | 1.308 | 13.54% | 1.319 | 23.39% |
| 512 | 1.210 | 20.02% | 1.221 | 29.08% |

TABLE 5

Transistor Counts for Direct-Mapped, 4-Way Set Associative Mapped and
Fully-Associative Mapped PRCs

| PRC Size (bytes) | Direct-Mapped Transistor Count | 4-Way Set-Associative Transistor Count | Full-Associative Transistor Count |
|---|---|---|---|
| 256 | 23,276 | 29,813 | 26,616 |
| 512 | 44,161 | 50,706 | 51,000 |
| 1,024 | 86,006 | 92,567 | 100,024 |
| 2,048 | 169,835 | 176,428 | 198,584 |
| 4,096 | 337,760 | 344,417 | 396,728 |
| 8,192 | 674,133 | 680,918 | 795,064 |
| 16,384 | 1,347,914 | 1,354,955 | 1,595,832 |
| 32,768 | 2,697,535 | 2,705,088 | 3,205,560 |
| 65,536 | 5,400,884 | 5,409,461 | 6,441,400 |

What is claimed is:

1. A method for reducing primary cache miss latency in a microprocessor system that includes a microprocessor, a main memory and a primary cache connected between the main memory, and microprocessor comprising the steps of:
    connecting a predictive read cache memory between the main memory and the primary cache;
    tracking multiple data read miss address patterns from the primary cache memory; and
    associating the multiple data read miss address patterns from the primary cache with specific instructions from the microprocessor that generate the multiple data read miss address patterns.

2. The method of claim 1 wherein the step of tracking multiple data read miss address patterns from the primary cache memory further comprises the step of applying a displacement-based algorithm to the multiple data read miss address patterns.

3. The method of claim 1, further comprising the step of identifying the instructions that generate the data read miss address patterns from the primary cache memory by using the addresses of the instructions that generate the patterns.

4. The method of claim 3 further comprising the steps of:
    using the least significant bits of the instruction address that generates a data read miss in the primary cache memory to select a block in the predictive read cache memory; and
    comparing the most significant bits of the instruction address that generates a data read miss in the primary cache memory with an address tag stored in the block.

5. A method for forming a predictive read cache for reducing primary cache miss latency in a microprocessor system that includes a microprocessor, a main memory and a primary cache memory connected between the main memory and the microprocessor via an instruction address bus, a data address bus and a data bus, the primary cache being arranged to output both a data read miss address when it receives an instruction to read data that is not in the primary cache memory and the address of the instruction that generated the memory read, comprising the steps of:
    connecting a first plurality of memory blocks arranged to form an instruction address tag field (IATG) to the instruction address bus;
    connecting a first comparator means to the IATG field and to the instruction address bus to receive the most significant bits of an instruction address that generated a memory read which resulted in a data cache read miss,
    connecting a second plurality of memory blocks arranged to form a most recent miss memory address (MRMA) field to the data address bus;
    arranging a third plurality of memory blocks to receive the MRMA field and form a previous miss address field (PRMA) as new memory addresses are received in the MRMA field from the data address bus;
    processing the MRMA field and the PRMA field with a displacement algorithm to provide a predicted address to the data address bus and to the PDMA field;
    arranging a fourth plurality of memory blocks to receive the predicted address and form a predicted memory address (PDMA) field;
    arranging a second comparator means to compare data address bits from the data address bus with data in the PDMA field and;
    arranging a fifth plurality of memory blocks to form a predicted data (PDDT) field that is sent to the primary cache memory via the data bus if the first and second comparators produce outputs indicating the occurrence of matches in both the IATG and PDMA fields, respectively.

6. The method of claim 5, further comprising the steps of:
    connecting a first set of comparators to the IATG field so that each memory block in the IATG field has a corresponding comparator;
    connecting a first binary encoder to the first set of comparators;
    connecting a second set of comparators to the PDMA field so that each memory block in the PDMA field has a corresponding comparator;
    connecting a second binary encoder to the second set of comparators.

7. The method of claim 5, further comprising the steps of:
    arranging the memory blocks in each of the IATG, MRMA, PRMA, PDMA and PDDT fields in a plurality of sets with a selected number of blocks per set;

connecting a first comparator array to the IATG field;

connecting a first encoder to the first comparator array;

connecting a second comparator array to the PDMA field;

connecting a second encoder to the second comparator array;

connecting a first multiplexer to receive the output of the MRMA field;

connecting a second multiplexer to receive the output of the PRMA field and;

connecting a third multiplexer to receive the output of the PDDT field.

8. A predictive read cache for reducing primary cache miss latency in a microprocessor system that includes a microprocessor, a main memory and a primary cache memory connected between the main memory and the microprocessor via an instruction address bus, a data address bus and a data bus, the primary cache being arranged to output both a data read miss address when it receives an instruction to read data that is not in the primary cache memory and the address of the instruction that generated the memory read, comprising:

a first plurality of memory blocks connected to the instruction address bus and arranged to form an instruction address tag field (IATG);

a first comparator having a first input connected to receive an output from the IATG field and a second input connected to the instruction address bus to receive the most significant bits of an instruction address that generated a memory read which resulted in a data cache read miss;

a second plurality of memory blocks connected to the data address bus and arranged to form a most recent miss memory address (MRMA) field;

a third plurality of memory blocks arranged to receive the MRMA field and form a previous miss address field as new memory addresses are received in the MRMA field from the data address bus;

means for processing the MRMA field and the PRMA field to provide a predicted address to the data address bus;

a fourth plurality of memory blocks arranged to receive the predicted address and form a predicted memory address (PDMA) field;

a second comparator connected to the PDMA field and to the data address bus arranged to compare data address bits with data in the PDMA field; and a fifth plurality of memory blocks connected to the data bus and arranged to form a predicted data (PDDT) field that is sent to the primary cache memory via the data bus if the first and second comparators produce outputs indicating the occurrence of matches in both the IATG and PDMA fields, respectively.

9. The predictive read cache of claim 8 further comprising means for selecting a specific block of the IATG field with the log2n least significant bits of the instruction address; and means for comparing the instruction address less its log2n least significant bits with data stored in the selected block of the IATG field.

* * * * *